(12) United States Patent
Pegoraro

(10) Patent No.: US 11,799,659 B2
(45) Date of Patent: Oct. 24, 2023

(54) METHOD, ARCHITECTURE AND DEVICES FOR THE REALIZATION OF AN ENCRYPTED COMMUNICATION PROTOCOL OF ENCRYPTED DATA PACKETS NAMED 'TRANSPORT ENCRYPTED PROTOCOL' (TEP)

(71) Applicants: Gabriele Edmondo Pegoraro, Luino (IT); Christian Fabio Persurich, Milan (IT); Gianluca Tirozzi, Florence (IT)

(72) Inventor: Gabriele Edmondo Pegoraro, Luino (IT)

(73) Assignees: Gabriele Edmondo Pegoraro, Luino (IT); Christian Fabio Persurich, Milan (IT); Gianluca Tirozzi, Florence (IT)

(*) Notice: Subject to any disclaimer, the term of this patent is extended or adjusted under 35 U.S.C. 154(b) by 253 days.

(21) Appl. No.: 17/059,348

(22) PCT Filed: May 24, 2019

(86) PCT No.: PCT/IB2019/054343
§ 371 (c)(1),
(2) Date: Nov. 27, 2020

(87) PCT Pub. No.: WO2019/229612
PCT Pub. Date: Dec. 5, 2019

(65) Prior Publication Data
US 2021/0243031 A1 Aug. 5, 2021

(30) Foreign Application Priority Data
May 28, 2018 (IT) .................. 102018000005763

(51) Int. Cl.
*H04L 9/08* (2006.01)
*H04L 9/32* (2006.01)
(Continued)

(52) U.S. Cl.
CPC .......... *H04L 9/3239* (2013.01); *H04L 9/0825* (2013.01); *H04L 63/166* (2013.01);
(Continued)

(58) Field of Classification Search
CPC ... H04L 9/3239; H04L 9/0825; H04L 63/166; H04L 67/104; H04L 9/50; H04L 63/0428;
(Continued)

(56) References Cited

U.S. PATENT DOCUMENTS

2012/0236857 A1* 9/2012 Manzella ............... H04L 49/201
370/390
2015/0058933 A1 2/2015 Larson et al.
(Continued)

FOREIGN PATENT DOCUMENTS

WO 2017/182844 A1 10/2017

OTHER PUBLICATIONS

IBM, Type 1 vs. Type 2 hypervisors https://www.ibm.com/topics/hypervisors (Year: 2018).*
(Continued)

*Primary Examiner* — Carl G Colin
*Assistant Examiner* — Andrew Suh
(74) *Attorney, Agent, or Firm* — Maier & Maier, PLLC

(57) ABSTRACT

Method, devices, programs and system for the realization of an encrypted protocol for the transmission of encrypted data packets, called "Transport Encrypted Protocol" (TEP), intended for communication, characterized by a particular methodology of data encrypted encapsulation according to the blockchain paradigm including the following steps: the establishment of a distributed ledger which generate sender and recipient addresses to establish a communication characterized by the encryption of both the content and the transport channels; the verification of the integrity of the message and the correct correspondence of the address by
(Continued)

the receiving node (hash), which decrypts each layer of encapsulation and hence decrypting the message itself; and the submission of an encrypted notification of receipt to the sender node and the subsequent preparation of the receiving node to the next state, either the break in communication or the modification of its status from recipient to sender.

19 Claims, 4 Drawing Sheets

(51) Int. Cl.
　　*H04L 9/00*　　　(2022.01)
　　*H04L 9/40*　　　(2022.01)
　　*H04W 12/02*　　(2009.01)
　　*H04W 88/08*　　(2009.01)
　　*H04L 67/104*　　(2022.01)

(52) U.S. Cl.
　　CPC ......... *H04L 67/104* (2013.01); *H04W 12/02* (2013.01); *H04W 88/08* (2013.01); *H04L 9/50* (2022.05)

(58) Field of Classification Search
　　CPC ....... H04W 12/02; H04W 88/08; H04W 8/02; H04W 36/08
　　See application file for complete search history.

(56) References Cited

U.S. PATENT DOCUMENTS

| 2015/0244690 | A1 | 8/2015 | Mossbarger | |
| 2016/0241702 | A1* | 8/2016 | Gorajala Chandra | ........................ H04W 24/04 |
| 2017/0324708 | A1* | 11/2017 | Register | .............. H04L 63/0227 |
| 2017/0324738 | A1 | 11/2017 | Hari et al. | |
| 2018/0048738 | A1 | 2/2018 | Hinds | |
| 2019/0190887 | A1* | 6/2019 | Yan | ...................... H04L 61/5007 |
| 2019/0342084 | A1* | 11/2019 | Mehedy | ................ H04L 9/0825 |
| 2019/0386969 | A1* | 12/2019 | Verzun | ................. H04L 9/0662 |
| 2020/0007316 | A1* | 1/2020 | Krishnamacharya | ........................ H04L 9/0637 |
| 2020/0259863 | A1* | 8/2020 | Lee | ....................... H04L 63/166 |
| 2021/0075623 | A1* | 3/2021 | Petersen | .................. H04L 9/50 |

OTHER PUBLICATIONS

Wikipedia, Classification by Robert P. Goldberg classified two types of hypervisor: https://en.wikipedia.org/wiki/Hypervisor#:~:text=A% 20hypervisor%20(also%20known%20as,is%20called%20a%20guest% 20machine. (Year: 1973).*

International Search Report and Written Opinion dated Aug. 22, 2019 in corresponding International Application No. PCT/IB2019/ 054343; 16 pages.

Krzysztof Okupski, "Bitcoin Developer Reference Working Paper Last changes: Jul. 30, 2016", Jul. 30, 2016, Retrieved from the Internet: URL:https://www.lopp.net/pdf/Bitcoin_Developer_Reference. pdf Retrieved on Aug. 13, 2019, 43 pages.

Kristiina Valtanen et al., "Creating Value Through Blockchain Powered Resource Configurations: Analysis of 5G Network Slice Brokering Case", 2018 IEEE Wireless Communications and Networking Conference Workshops (WCNCW), IEEE, Apr. 15, 2018, pp. 185-190.

* cited by examiner

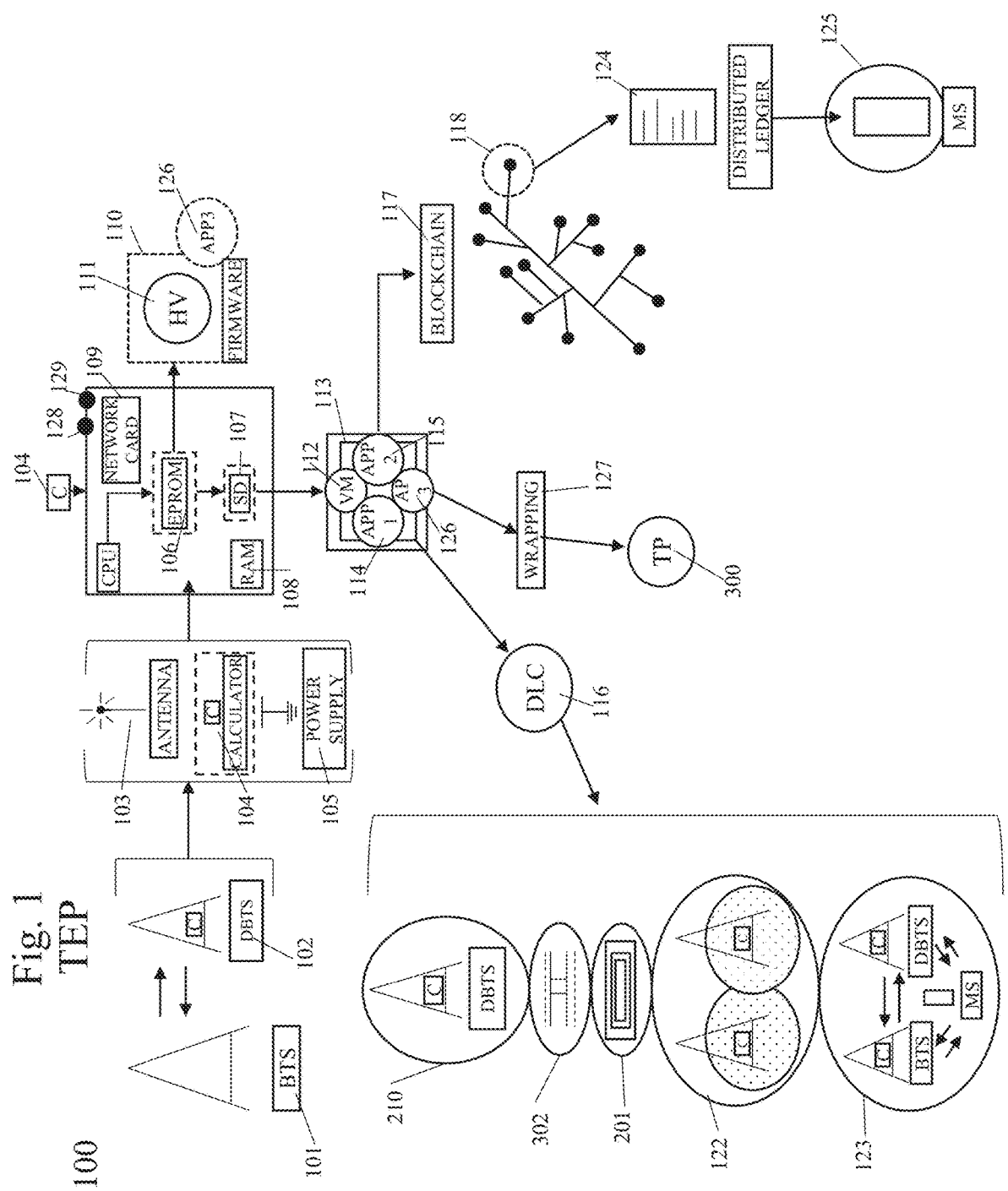

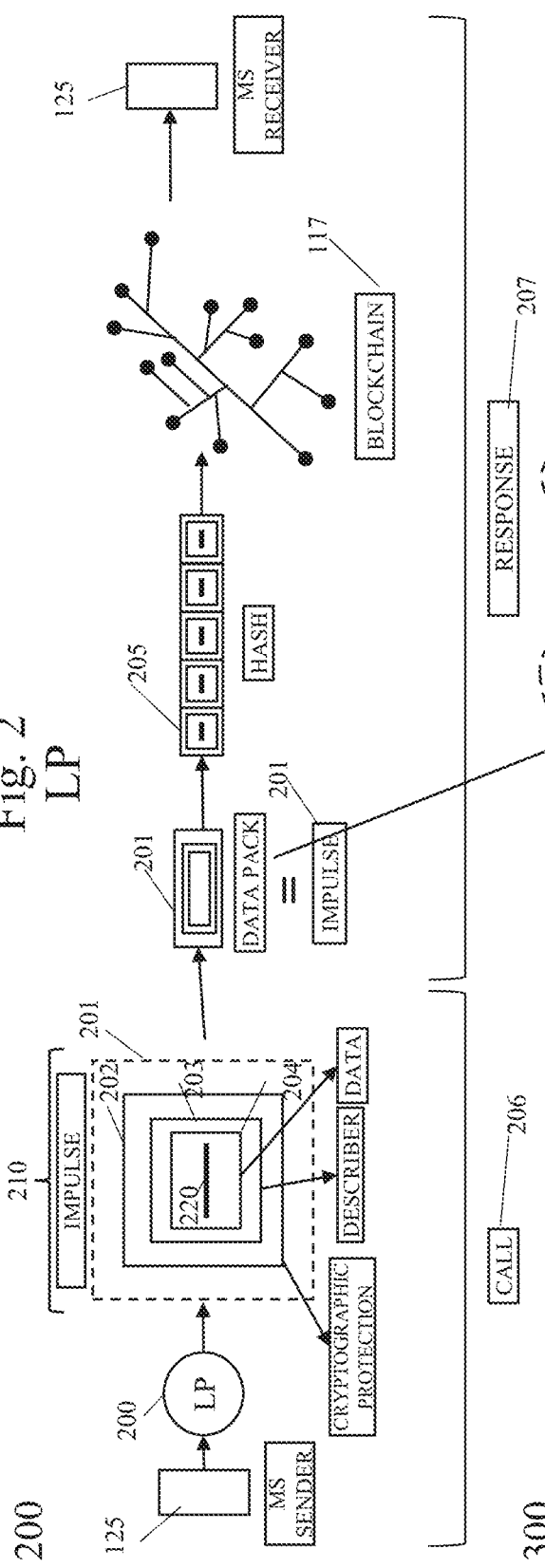
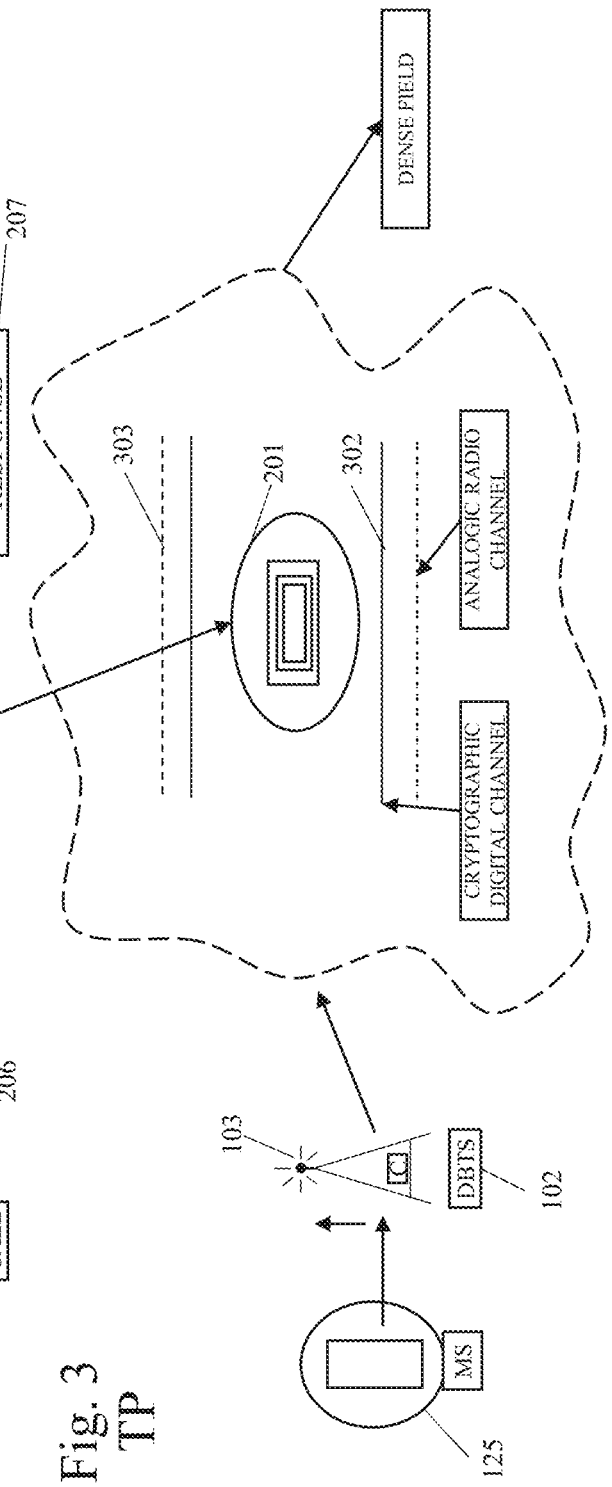

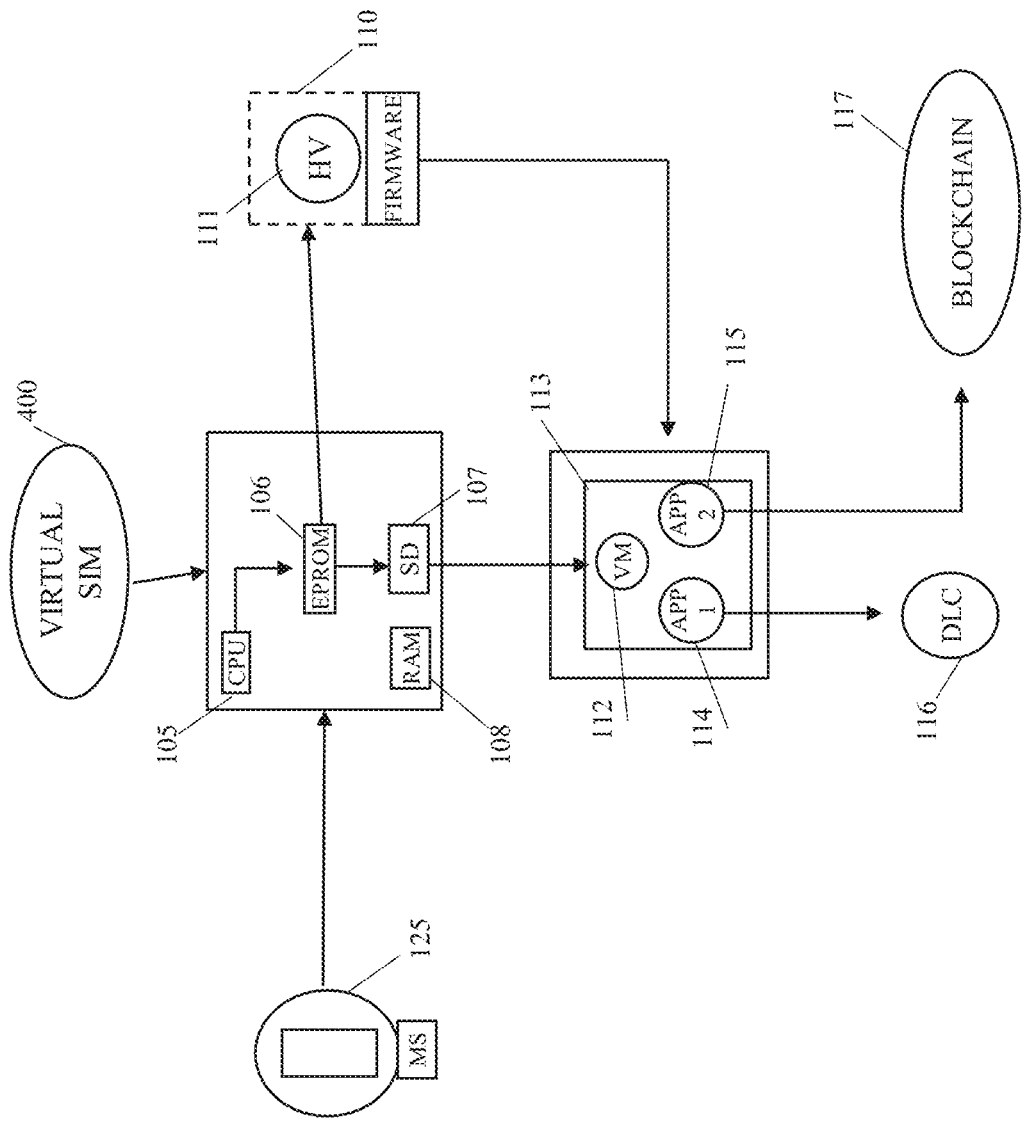

METHOD, ARCHITECTURE AND DEVICES FOR THE REALIZATION OF AN ENCRYPTED COMMUNICATION PROTOCOL OF ENCRYPTED DATA PACKETS NAMED 'TRANSPORT ENCRYPTED PROTOCOL' (TEP)

FIELD

The present invention finds application in the field of communications and, specifically, in the telecommunication system.

BACKGROUND

As other current transmission protocols, also the present protocol performs the function of transport of data packet but, it differentiates itself as data packets employed by the present TEP ('Transport Encrypted Protocol') protocol do not rely neither on DNS, nor on IP (as conceived, as an example, by Hari et al. US-2017/0324738 A1 e da Larson et al. US-2015/0058933 A1). In fact, thanks to a particular methodology of encapsulation and to the peer-to-peer technology stemmed from the blockchain paradigm, transferred data are based on the hash, namely on the generation of relational keys which contain, in a comprehensive way, all data within the part of encapsulation named 'descriptor' (all status data of the metadata) hence ensuring higher security of the communications.

Moreover, the present TEP protocol differentiates itself from other inventions (please refer, as an example, to Luke US-2018/0048738 A1) which use the blockchain only on the fourth layer of the ISO/OSI model (ISO 7498, so called 'transport layer'), namely only on the so called 'segmentation'; instead, the TEP protocol applies the blockchain not only on said layer 4, but also on layer 3, namely the so called 'payload and network layer', thus on the last one of the three physical layers.

Hence, in so doing, the TEP protocol differentiates itself also from other earlier ones (please refer, as an example, Mossbarger US-2015/0244690 A1), which did not modify the heart of the network architecture as the TEP protocol does, just because this latter operates also on the layer 3 of the physical level.

Another main difference with respect to other data packet protocols intended for communication and, specifically, for mobile telecommunication, currently in use is the length of data packet: current protocols imply a fixed-length, while in this case we can generate data packet with variable length. Hence, several levels of data compression can be generated enabling the speeding up of the transfer operations, by means of a higher compression, in case of critical field conditions. Namely, within each fixed-length hash we transfer there can be contained several numbers of data packets providing that each hash has the same length. Thus, the present TEP protocol belongs to the highest layers of the classification protocol levels, as defined by the ISO/OSI model.

Moreover, the present TEP protocol implies the progressive realization of a new type of BTS, named Dematerialized Base Transceiver Station 'DBTS', in which its respective physical component is dematerialized by means of the implementation of software (hypervisor, virtual machine and relative applications intended to the management of both the Dematerialized Logic Circuit and the blockchain) which, thanks to the configurations adopted by said software which simulate physical circuits, enable to commute the communications also with the infrastructures (BTS) and the devices (mobile stations) based on the traditional protocols, hence ensuring in such a manner the perfect integration among traditional infrastructures and the present TEP protocol.

In such a manner, the present invention introduces said new typology of BTS, named DBTS, which become genuine 'processing apparatuses', which detailed description has not been provided yet by earlier inventions which had implied the blockchain paradigm (please see, as an example, Mossbarger US-2015/0244690 A1).

SUMMARY

The current protocols present several issues in terms of security, as they are all subject of attacks such as 'spoofing', 'denial-of-service' and 'man-in-the-middle' kind. Moreover, these protocols do not have a sufficient capability to guarantee the authenticity of each single transaction (namely, every type of communication exchange occurred in the net).

Again, another issue is represented by the inefficiency of the commutations and of the connections, caused by the stratification of different protocols layers and by the use of different physical devices implied to manage the routing.

Thanks to the two underlying principles of the present protocol, namely the use of the blockchain associated to the partial dematerialization (virtualization) of the BTS, which then become converted into DBTS (Dematerialised Base Transceiver Station), the present TEP protocol allows to obtain the following advantages as compared with current traditional protocols:

the possibility to realize there different typologies of network:
  i. decentralized, each mobile station (MS) could commutate itself into a DBTS;
  ii. distributed, thanks to the presence of stable intermediate infrastructures (DBTS) equipped with the same synchronized blockchain;
  iii. global, the whole network can cover the entire terrestrial globe, even interconnecting itself to the current network;
the possibility, thanks to the blockchain technology, to commute each MS into DBTS, which become themselves nodes of the network, compatible with and within the limits imposed by the power and the architecture of said MS;
greater stability of communications, thanks to blockchain technology, since each cell is able to independently manage the handover as if it were an HLR or a VLR;
higher transmission speed and greater resistance to critical field conditions, since, again thanks to the blockchain paradigm, unlike previous protocols whose data packet length is generally fixed, in this case we can generate variable-length packets instead. In this way it is possible to create more packet compression levels and therefore, in case of critical field conditions, transmission operations can be speeded up through greater compression: namely, within each fixed-length hash we transfer there can be contained several numbers of data packets providing that each hash has the same length;
impenetrability to 'man-in-the-middle' type physical attacks performed on the microcomputer in the DBTS, as any activity generates a synchronization error that determines the destruction of the memory decryption keys in the computer and a 'wipe' which proceeds to reset and reinitialize the contents of the memory, thus avoiding data loss and data breach;

intelligibility of the data transmitted exclusively for the benefit of the recipient, thanks to the cryptography, also related to the blockchain technology, which basically produces a data dump that cannot be understood by anyone who has not initially negotiated the exchange of keys (since this phase is off line, nobody is able to intercept this first exchange), therefore, at the application level, there is a communication in which, both on each 'end point' and in the path (transport level), the data exchanged are not intelligible;

authenticity of the message and the sender (natural and anti-phishing anti-spam), as guaranteed by the functioning of the blockchain;

authenticity of the receiver (anti-spoofing and anti-spoofing of the DNS), a further effect of the application of the blockchain paradigm;

defense of the entire infrastructure (antiflod, anti-denial of service—DDOS), due to the fact that the blockchain paradigm builds hashes on the entire dimension of its structure;

spontaneous generation of the triangulation, according to the interpolation method, which allows, knowing the intensity in decibels of the impulse sequence and the area covered by the reference DBTS, the identification of a band of placement of the mobile station, as coordinated polar (data contained in the descriptor);

possibility, thanks to the virtualization of physical circuits, to produce different types of DBTS with different sizes and different capacities ("size") adaptable to the needs of the project;

possibility, again thanks to the virtualization of physical circuits, to create mobile telecommunications structures through the production of easily transportable DBTS;

lower cost-of-equipment, thanks to the virtualization of physical circuits (computers costs about 15 times less than physical circuits);

lower infrastructure maintenance costs, thanks to the virtualization of physical circuits;

greater ease of installation and location, thanks to the virtualization of physical circuits;

less environmental impact, thanks to the virtualization of physical circuits;

possibility of progressively implementing this technology, supporting traditional protocols and existing network technology (GSM, 3G, 4G/LTE) for a certain period of time and thus ensuring a smooth transition to this new technology. This thanks to the possibility of the software present inside the virtual machine, present inside the computer integrated in the partially dematerialized transceiver apparatuses inserted as a component of every single DBTS, to create different configurations that simulate existing apparatuses and thus allowing the communication to be commutated evenly with the structures that are based on the old protocols (IPX, UDP, TCP/IP)

possibility, for the reasons explained above, of being able to 'coexist' not only with the current protocols and with the existing network technology (GSM, 3G, 4G/LTE), but also with the future one, as possible implementations of network standards such as for example the 5G network and any subsequent developments.

The object of the present invention is to provide at least one encrypted transmission protocol intended for communication, in particular to mobile telecommunications, of encrypted data packets encapsulated by a particular methodology 210 according to the blockchain paradigm 117 and named Transport Encrypted Protocol (TEP) 100.

The invention, namely a method, devices, programs and a system for the realization of said protocol, as illustrated in figure n.1 and figure n.5, comprises the following steps:

the establishment of a distributed ledger based on the blockchain paradigm (117), namely whereas each address is a hash calculated by means of a method of encrypting, such as SHA-512 type, able to generate sender and recipient addresses;

the establishment of a communication characterized by the encryption of the content to be transmitted and of the channels which transport it, namely characterized by a particular methodology of the encapsulation (210) of the transport layer and of the application level, as defined by the ISO/OSI model;

the transmission of said encrypted data by means of the selection of an address, namely a destination node also known as hash, with the aim to request a direct send, namely a routing which goes through the minimum number of nodes, thus point-to-point, if sufficiently close, or peer-to-peer type, if the transmission needs to go through intermediate nodes, which nonetheless do not affect the transmission channel, hence they do not store copy of the node data, other than for as long as is strictly necessary to the data transit;

the receiving of data made by the receiving node, which verifies the integrity of the message and the correct correspondence of the address, decrypts each layer of said particular encapsulation up to the message and hence it decrypts the message;

the submission of an encrypted notification of receipt to the sender node, namely either an error or a success message, and the subsequent preparation of the receiving node to the next state, namely either the break in communication or, preparing itself to a possible response, the modification of its status from receiver to sender.

The present method further comprises:

fully digital management of the base transceiver stations (BTS) 101 by means of the use of a particular encapsulation methodology 210 and peer-to-peer technology, which takes advantage of the blockchain 117 paradigm, which transforms the traditional database with a centralized management system into a distributed database 124 which allows each node 118 to interconnect peer-to-peer and simultaneously verify the uniqueness of the customer, thus allowing a communication that is more protected and impenetrable to the main cyber-attacks;

partial dematerialization of each BTS 101, through the use of a partially dematerialized circuit transceiver apparatuses by replacing the physical component of the circuits with a computer 'C' 104 (understood as any type of technology such as, by way of a mere example only, nano-computer, quantum logic fuzzy computers, etc., namely computers able to easily perform the procedural calculation of a circuit simulation) integrated within each BTS (which is thus effectively switched to a Dematerialized Base Transceiver Station 'DBTS' 102) and powered by the power supplied by the traditional power supply already present in each traditional BTS 101, which is connected to a 'HV' 111 hypervisor which, in turn, starts a 'VM' 112 virtual machine, which, thanks to the software equipped with its own operating system 113, it allows the management of the Dematerialized Logic Circuit 'DLC' 116, which, thanks to an application 114:

i. the physical government of the antenna of said DBTS 103, namely it communicates the antenna how to create the pulse 201;
ii. the creation of the digital cryptographic channel 302, which juxtaposed itself, by means of a frequency modulation commutation, to an array of radio frequency analogic channels 303 predetermined by each State on the basis of the geographic area of interest;
iii. the determining of the manner in which said data encapsulation 210 must be composed so that the recipient can decode data;
iv. the management of the handover 122 among the mobile stations 125 which use the same TEP protocol 100;
v. the creation of several configurations 123 which, by means of the simulation of physical apparatuses, permits to uniquely commutate the communications also to devices and structures, both BTS 101 and mobile stations 125, based on traditional protocols, by ensuring in this way a successful integration between traditional infrastructures and the present TEP protocol 100.

Said operating system 113, present inside the aforementioned virtual machine 'VM' 112, also manages, through a specific application 115, the same blockchain 117, which contains the complete database 124 of all caller I.D. and which therefore manages the calls, applying defined criteria to the individual 125 mobile stations, thereby replacing the traditional HLR and VLR.

Finally, a further application 126, installed indifferently inside the firmware 110 of the aforementioned computer 'C' 104 or within the operating system 113 contained in the aforementioned virtual machine 'VM' 112, carries out the last phase ('wrapping') encryption of the data packet using SSL 127 protocol for subsequent transmission via the 'Transport Protocol' (TP) 300.

BRIEF DESCRIPTION OF THE DRAWINGS

FIG. 1 indicates the overall scheme of operation of the TEP protocol (100);

FIG. 2 indicates the structure and operation of the Logical Protocol "LP" (200);

FIG. 3 indicates the structure and functioning of the Transport Protocol "TV" (300);

FIG. 4 indicates the components and operation of the virtual SIM CARD "VS" (400);

Figure 5:
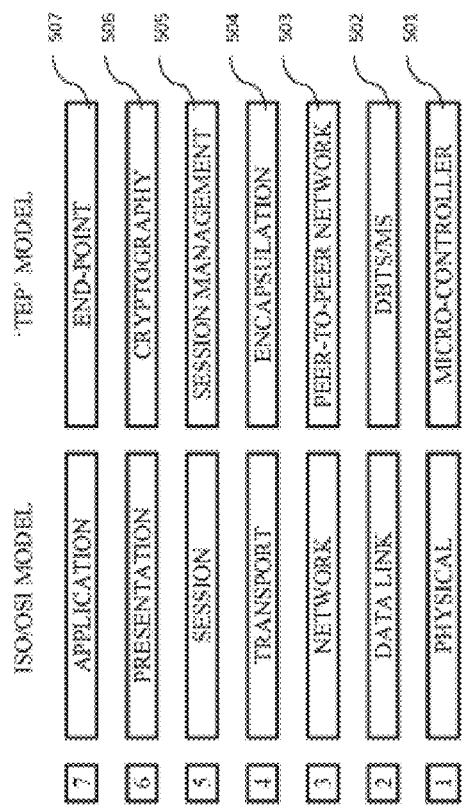
FIG. 5 describes the implementation of the protocol according to the standard indicated in the ISO/OSI model (500).

The numerical references cited within the "claims" have the sole purpose, referring to the aforementioned figures, of making the claims themselves more understandable and are not to be interpreted as a limitation to the subject matter of protection by the claims themselves.

DETAILED DESCRIPTION

The description provided in this document has the sole purpose of making the possible uses deriving from the exploitation of the TEP protocol comprehensible from a practical and conceptual point of view. It also appears evident to anyone in possession of ordinary skills in this specific area to understand how the principles enunciated in the present invention can be concretized in numerous other forms and methods.

The objective of the present invention is the realization of an encrypted transmission protocol intended for the communication of data packets (illustrated in FIG. 1) encapsulated by a particular methodology 210 according to the paradigm of the blockchain 117 and named Transport Encrypted Protocol 'TEP' 100 and related apparatuses necessary (DBTS 102) or useful (virtual CARD SIM 400) for its operation.

Said protocol comprises the following steps:
the establishment of a distributed ledger based on the blockchain paradigm (117), namely whereas each address is a hash calculated by means of a method of encrypting, such as SHA-512 type, able to generate sender and recipient addresses;
the establishment of a communication characterized by the encryption of the content to be transmitted and of the channels which transport it, namely characterized by a particular methodology of the encapsulation (210) of the transport layer and of the application level, as defined by the ISO/OSI model;
the transmission of said encrypted data by means of the selection of an address, namely a destination node also known as hash, with the aim to request a direct send, namely a routing which goes through the minimum number of nodes, thus point-to-point, if sufficiently close, or peer-to-peer type, if the transmission needs to go through intermediate nodes, which nonetheless do not affect the transmission channel, hence they do not store copy of the node data, other than for as long as is strictly necessary to the data transit;
the receiving of data made by the recipient node, which verifies the integrity of the message and the correct correspondence of the address, decrypts each layer of said particular encapsulation up to the message and hence it decrypts the message;
the submission of an encrypted notification of receipt to the sender node, namely either an error or a success message, and the subsequent preparation of the recipient node to the next state, namely either the break in communication or, preparing itself to a possible response, the modification of its status from recipient to sender.

Said protocol allows the fully digital management of the base transceiver stations, which are then called Dematerialized Base Transceiver Station (DBTS) 102, by means of the use of peer-to-peer technology that exploits the blockchain paradigm 117, associated with partial dematerialization (virtualization) of each traditional BTS 101 by replacing, within each of them, the physical component of the circuits with a partially dematerialized transceiver, consisting of a computer 'C' 104, connected to a 'HV' 111 hypervisor which, in turn, starts a virtual machine 'VM' 112, which, thanks to software 114 and 115 which it is equipped with, manages both the Dematerialized Logic Circuit 'DLC' 116 and the blockchain itself 117. In so doing, the 'DLC' 116 Dematerialized Logic Circuit performs the following functions:

physically governs the antenna 103 of the DBTS 102, namely it communicates to the antenna how to create the impulse 201;
creates the encrypted digital channel 302;
establishes how the encapsulation 210 must be composed so that the receiver can decode the data;
manages the calls (handovers) 122 that take place between mobile stations 125 that use the same TEP 100 protocol;
creates different configurations that simulate physical equipment, thus enabling the communication to be commutated evenly with the structures (BTS 101) and the devices (125 mobile stations) based on traditional protocols, thus ensuring perfect integration between traditional infrastructures and the present TEP 100 protocol.

Said operating system 113, present inside the aforementioned virtual machine 'VM' 112, also manages, through a specific application 115, the same blockchain 117, which contains the complete database 124 of all caller I.D. and which therefore manages the calls, applying defined criteria to the individual 125 mobile stations, thereby replacing the traditional HLR and VLR.

Finally, a further application 126, installed indifferently inside the firmware 110 of the aforementioned computer 'C' 104 or within the operating system 113 contained in the aforementioned virtual machine 'VM' 112, carries out the last phase ('wrapping') encryption of the data packet using SSL 127 protocol for subsequent transmission via the 'Transport Protocol' (TP) 300.

The digital management of the DBTS 102 takes place therefore through the use of peer-to-peer technology which takes advantage of the paradigm of the blockchain 117, which transforms the traditional database with a centralized management system into a distributed database 124 that allows each node 118 to interconnect peers-to-peer and, at the same time, to verify the uniqueness of the customer, thus allowing a communication that is more protected and impenetrable to the main cyber-attacks.

The TEP 100 protocol therefore comprises:
- a Logical Protocol "LP" 200, further better described;
- a Transport Protocol "TV" 300, further better described;
- partially dematerialized BTS, called Dematerialized Base Transceiver Station (DBTS) 102 with a transceiver device integrated inside them whose physical circuits are represented by a single computer 'C' 104, hereinafter better specified;
- a computer 'C' 104, installed inside said DBTS 102, which comprises a CPU 119, an EPROM memory chip (Erasable Programmable Read Only Memory) 106, a memory card of the micro-SD 107 type, a RAM card 108, a network card 109 and a number 'n' of INPUT/OUTPUT ports 128 and 129;
- a 'HV' 111 hypervisor, physically installed in an EPROM (Erasable Programmable Read Only Memory) 106 memory chip, which is part of said computer 'C' 104, and therefore is a software which constitutes the interface between a virtual machine 'VM' 112 and the physical apparatuses (DBTS) 102;
- a virtual machine 'VM' 112, physically installed inside said memory card of the micro-SD 107 type, which is activated by said hypervisor 'HV' 111 and which contains an operating system 113 which allows the operation of the two applications 114 and 115, respectively responsible for managing the Dematerialized Logic Circuit 'DLC' 116 and the blockchain 117;
- a 'DLC' 116 Dematerialized Logic Circuit;
- an application 115, the second of the two applications mentioned above, installed inside said operating system 113 of the virtual machine 'VM' 112, which represents the framework of the blockchain 117 and which contains the database complete with all caller I.D. 124 and which therefore manages the calls, applying defined criteria to the single mobile stations (MS) 125;
- a further application 126, finally, installed indifferently inside the firmware 110 of said computer 'C' or within the operating system 113 contained in said virtual machine 'VM' 112, which carries out the last encryption step of the data package using the SSL protocol ('wrapping') 127 for subsequent transmission via the 'Transport Protocol' (TP);
- a mobile station (MS) of the traditional type 125, intended at present as a user terminal;
- a modified mobile station 400 with the replacement of the traditional SIM 401 with a virtual SIM 400 (the latter intended as an optional device and not necessary for the operation of the TEP protocol, but certainly implementable and object of a specific claim within the present patent application) which, as better described below, allows the same mobile station to be switched to a node of the peer to peer transmission.

The Logic Protocol 'LP' 200 and the Transport Protocol 'TP' 300

The present method said TEP protocol 100 comprises Logic Protocol 'LP' 200 and the Transport Protocol 'TP' 300, differentiating itself from other communication protocols in that it is based, at a connection level, on a distributed database and not on centralized database, with which it is capable, at any rate, of dialoguing and, moreover, at a data representation level, it is capable of embedding, within said encapsulation, any other network schemes. Said TEP protocol 100 further differentiates itself from other communications protocols in that it operates on every single one of the seven layers standardized by the ISO/OSI model, hence from the physical part of the hardware to the highest application layer. Said TEP 100 hence operates on said ISO/OSI layers matching each layer with the following specific operating functions:
- layer 1, so-called 'Physical', it corresponds to a microcontroller 501, comprising an antenna, a transmitter and a receiver;
- layer 2, so-called 'Data link', it corresponds to an interface 502 comprising said DBTS 102 and said mobile stations 125;
- layer 3, so-called 'Network', it corresponds to said peer-to-peer network 503;
- layer 4, so-called 'Transport', it corresponds to said encapsulation 504;
- layer 5, so-called 'Session', it corresponds to a session management 505, which has the function of managing the duration of validity of the encryption keys;
- layer 6, so-called 'Presentation', it corresponds to said encryption 506, namely a system which implies an encryption capable of both deciphering and enciphering a content;
- layer 7, so-called 'Application', it corresponds to an end-point 507, namely an interface capable of encoding data".

The Logic Protocol 'LP' 200

The Logic Protocol 'LP" 200 (illustrated in FIG. 2) is a software that represents a fourth protocol, evolution of TCP/IP, therefore a communication protocol with encryption of encrypted packets 201. It consists of encapsulations 210 and works on calls 206 and answers 207. At each event, be it a call (206) or a reply (207) ('ping pong' or 'polling'), the protocol generates an encrypted packet 201 according to the blockchain paradigm 117 so that the communication is unique and authentic, then 'trusted'. Furthermore, as in traditional TCP/IP protocols, the data packet is routed to addresses registered in a special ledger (namely what, in a protocol such as the TCP/IP based on the IP register that converts domain names into addresses, it is called DNS) which converts coded addresses according to the standards of all other protocols into as many 'hashes', which in turn constitute the appropriate 'address' (or 'dedicated address') generated by the blockchain.

The TEP protocol is therefore based on a data dump that contains:

- in the outermost enclosure (or capsule) 202 the cryptographic protection of all that is contained therein, namely the cryptographic representation of the data package useful for deciphering;
- in the envelope 203, which is contained within the previous 202, there is the metalanguage that provides the receiver with the possibility of interpreting the content (the so-called 'descriptor');
- finally, in the last case 204, also contained inside the previous casing (or capsule) 203, there is the message 220 itself, that is the set of coded data (the so-called transacted).

Said particular methodology of encapsulation 210 differentiates itself from those employed in other types of communication protocols in that it is lighter, as the header contains only one sublayer, unlike what happens in all other protocols which have deeper nesting layers. Like the previous protocols, IPX, UDP, TCP, also the present protocol performs a function of transporting data packets according to the ISO/OSI standard. Differently, however, the packet data implemented by the present protocol are not based either on the DNS, nor on the IP, but on the hash 205, that is the generation of relational keys that report in a comprehensive manner the data in the encapsulation part called descriptor 203 (all metadata status data). Another difference compared to the previous protocols is the length of the data packets, which, in the previous protocols is generally fixed length, in this case we can generate variable length packages instead. In other words, more packet compression levels can be created, so in case of critical field conditions we can speed up the transmission operation through greater compression: Namely, within each fixed-length hash we transfer there can be contained several numbers of data packets providing that each hash has the same length.

The Transport Protocol 'TP' 300

The 'TV 300 Transport Protocol (shown in FIG. 3) is a communication channel that represents the interface necessary to carry the Logical Protocol 'LV 200 and is able to assume physical states biunivocally associated with logical states, so it is an invertible function, injective/surjective=bijective. These are radiofrequency pulses, which we can conventionally identify in the single data packet 201, generated by an antenna 103, plus a power supply 105, plus a computer 'C' 104 which contains the diagram that provides the following indications:

- to the power supply and to the antenna, both of the DBTS 102 and of the mobile station 125, how to create the aforementioned pulse 201, therefore what type and frequency of pulses produce to generate the necessary dense field 301;
- to the logical protocol 200, on the other hand, which should be its model, namely what its working logic should be, understood as the logical copy of an existing physical model and therefore both how to create the encrypted digital channel 302 and how it should be composed the encapsulation 210 for the receiver to decode the data 220. This last point is fundamental since the logical model must be able to give the same set of physical impulses, which represent the binary language, different meanings according to the different descriptors.

The same application also allows to manage the transaction handover 122 and to create different configurations which simulate physical apparatuses, thus allowing the communication to be commutated evenly with the structures (BTS 101) and the devices (mobile stations 125) based on the traditional ones protocols, thus ensuring the perfect integration between the traditional infrastructures and the present TEP 100 protocol.

This level of transport is based on the construction of a field 301 capable of carrying impulses 201. It is a dense field (because it is generated by antennas which engage peer to peer according to the blockchain paradigm 117) capable of supporting the frequency of the electromagnetic pulses 201 emitted by the antenna 410 of the mobile station 125. This field is furthermore formed by a range of analogue radio frequency channels 303 preset by each state according to the geographical area of interest which are juxtaposed to the digital encrypted channels 302 by means of a switching in frequency modulation.

Each mobile station 125 is independent and contributes to generate a temporary set 304 of discrete pulses 201, these temporary pulses are the input of the function contained in the virtual machine 112 which will manage the so called handover 122 of calls. By call handover 122 is meant which cells will serve the antenna 420 of the mobile station 125 which enters into communication, both in the hypothesis that the mobile station 125 is in roaming motion, whether it is stationary but in any case within the network defined as dense field 301. The interaction between said Logic Protocol 'LP' 200 and said Transport Protocol 'TP' 300 is realized by means of the peer-to-peer network composed of said DBTS, which hence enables the connection between the network interface, namely the physical ports, with the TEP datagram, namely the encapsulation method itself 210.

Calculator 'C' 104

The calculator 104 replaces the physical circuit component within each BTS 101, transforming them, in fact, into partially dematerialized BTS (DBTS) 102.

With the term calculator 104, reference is made more generally to any type of technology such as, by way of example only, computer, micro-computer, nano-computer, fuzzy logic computer, etc., and therefore computers capable of easily performing the procedural calculation of simulation of a physical circuit.

In this sense, therefore, the calculator is intended as a device, according to the Turing and Von Neumann model, which allows to perform extremely complex binary arithmetic calculations able to represent the most complex scenarios and capable of interacting through appropriate communication systems with humans.

Specifically, this device comprise:

a calculation unit, usually called CPU or micro-processor 119, which can process input data according to appropriate instructions and return their output manipulation;
multiple input units 128;
multiple output units 129;
several auxiliary units called random memories (RAM) 108;
several fixed memory units containing the basic instructions (ROM) 106;

more mass memory units containing both the processed data and the more advanced instructions (HARD DISK or mass memory) 107.

Hypervisor (HV)

Hypervisor 111, physically installed in an EPROM memory chip (Erasable Programmable Read Only Memory) 106, component of the firmware 110 of the computer 104, namely a software which constitutes the interface between the virtual machine 'VM' 112 and the physical apparatuses (DBTS) 102 and whose task is precisely to start the virtual machine 'VM' 112.

Virtual Machine 'VM' 112

The virtual machine 'VM' 112, which is a program, Turing paradigm, physically installed inside said memory card of the micro-SD 107 type and activated by said '1-1V' 111 hypervisor, which contains an operating system 113, which allows the operation of two applications 114 and 115, deputed respectively to the management of the Dematerialized Logic Circuit 'DLC' 116 and to the blockchain 117.

Thanks to the virtual machine 'VM' 112, therefore, the circuit part is completely dematerialized. The hardware part of the DBTS 102 is thus composed exclusively of an antenna 103, a power supply 105 and a computer 'C' 104, which activates the '1-1V' 111 hypervisor, which in turn activates a virtual machine 'VM' 112, which uses a peer to peer communication method, derived from the blockchain technology 117.

In this way the virtual machine 'VM' 112, through the applications 114 and 115 contained in its operating system 113, governs, respectively, the Dematerialized Logic Circuit 'DLC' 116 and the blockchain 117.

Dematerialized Logic Circuit (DLC)

The Dematerialized Logic Circuit 'DLC' 116, is an application, therefore a derivative program (as implemented by new libraries designed and developed specifically) by means of a 'fork' of the open source project 'OpenBTS', which juxtaposes logical units to corresponding physical units, that is to say, it makes said calculator 'C' (104) to execute, by means of a special application (114), a set of operations which simulate the physical circuit, the result of which will be the same as that of the physical circuits and which comprises:
- governing the circuit for the generation of the transport level, i.e. communicating to the antenna 103 of the DBTS how to create the pulse 201 producing a field 301 of a certain frequency modulation, thus effectively physically governing the antenna 103 of the DBTS 102;
- creating and managing the logic level to be coupled biunivocally to the transport level, that is to say how the encapsulation 210 must be composed so that the receiver can decode the data 220;
- creating the encrypted digital channel 302, which is juxtaposed to the range of analogue radio frequency channels 303 established by each State according to the geographic area of interest by means of frequency modulation switching;
- managing the handover 122 of the DBTS 102 communication;
- managing the blockchain 117.

Moreover, thanks to the possibility of the same software 114 present inside said virtual machine 'VM' 112 to create different configurations which simulate existing apparatuses, it allows to commutate communications one-to-one even with the structures based on the old protocols (IPX, UDP, TCP/IP) and on the existing network technology (GSM, 3G, 4G/LTE) or future (5G), thus ensuring the perfect integration between the old infrastructures and the present TEP 100 protocol.

The same application 114 also allows to switch the single mobile station (MS) 125 into a DBTS 102, or in a node 118 of the peer-to-peer network, in this way allowing the connection with other nodes 118, whether they are represented by BTS traditional 101, DBTS 102 or other mobile stations (MS) 125.

Application for call management.

The application 115, installed inside the operating system 113 of the virtual machine 112 installed inside said calculator 104 represents the framework of the blockchain 117 and contains the complete database 124 of all the caller I.D. transited through the DBTS 102 in which is installed (identifiers which constitute the blocks of the blockchain) and therefore manages the calls, applying defined criteria to the single mobile stations (MS) 125.

Application for SSL management 126.

Application 126, installed indifferently within the firmware 110 of said calculator 'C' 104, or within the operating system 113 contained in said virtual machine 'VM' 112, which carries out the last encryption step 127 of the data package by SSL ('wrapping') protocol for subsequent submission via the 'TP' 300 Transport Protocol.

Partially dematerialized BTS (DBTS) 102.

On the basis of what has been stated, it is clear that the use of the TEP 100 protocol will allow the use of DBTS 102 mini-apparatuses, partially dematerialized using virtual machines, which take advantage of the blockchain technology, a peer-to-peer system, in the field of radio-telecommunications and which will gradually replace the physical component of the circuits currently used in traditional BTS 101s.

This reduction in bulk will allow the production of partially dematerialized BTS (DBTS) 102 of new production, or, by simply replacing the existing physical circuit component by means of said calculator 'C' 104 in the existing BTS 101, will allow the system to interact and communicate the BTS 101 (so modified in DBTS 102) with the traditional BTS 101 not yet switched in DBTS 102. In fact, thanks to the said software 114 present inside said virtual machine 'VM' 112, which is able to create different configurations that simulate existing equipment, communications can also be switched bi-univocally with structures (BTS 101) and devices (mobile station 125) based on old protocols, thus ensuring perfect integration between the old infrastructures and the present TEP protocol 100.

Mobile Station (MS) 125.

The current mobile stations (MS) 125 can operate by the TEP protocol thanks, as mentioned, to the possibility offered by the software 114 present inside the virtual machine 'VM' 112 to create different configurations that simulate the physical circuits traditionally present inside of the current BTS 101.

Virtual SIM CARD (VS) 400.

FIG. 4 illustrates the ways in which the current mobile stations (MS) 125 can be equipped with an EPROM 106 containing the firmware 110 equipped with a "HV" 111 hypervisor. This 'HV' 111 hypervisor is part of the firmware 110 of said mobile station (MS) 125, i.e. a software that constitutes the interface between the virtual machine 'VM' 112 and the physical apparatuses, i.e. the traditional SIM CARD 401. The virtual machine 'VM' 112, that is a program installed inside said 'HV' 111 hypervisor and activated by it, through an application 114, replaces the traditional SIM CARD 401 and contains the customer identification and the wallet through which the user/user can pay for the services offered by his manager.

In this way, therefore, the virtual SIM CARD (VS) 400, exploits peer-to-peer communication based on the blockchain paradigm through the use of the TEP 100 protocol.

Moreover, thanks to the possibility of the same software 114 present within said virtual machine 'VM' 112 to create different configurations that simulate existing apparatuses, it allows to commutate the communications of each mobile station 125 even with the structures based on the old ones protocols (IPX, UDP, TCP/IP) and existing network technology (GSM, 3G, 4G/LTE) or future (5G), thus ensuring the perfect integration between the old infrastructures and the present TEP 100 protocol.

In the case in which this switching of the mobile station 125 is performed in DBTS 102, the same virtual machine 'VM' 112, by means of an application, manages the Dematerialized Logic Circuit 'WC' 116 to allow, compatibly and within the limits imposed by the power and the architecture of the mobile station 125 itself, of:

- physically governing the mobile station 125's antenna 410, namely it communicates the antenna how to create the pulse 201;
- creating the encrypted digital channel 302, which is juxtaposed to the range of analogue radio frequency channels 303 established by each State according to the geographic area of interest by means of frequency modulation switching;
- establishing how the encapsulation 210 must be composed so that the receiver can decode the data;
- managing calls, namely the handover 122;
- in the case of switching of the mobile station 125 to DBTS 102, or in a node 118 of the peer-to-peer network, said mobile station 125 allows connection with other nodes 118, whether they are represented by traditional BTS 101, by DBTS 102 or other mobile stations 125.

INDUSTRIAL APPLICABILITY OF THE INVENTION

The use of the present TEP protocol, thanks to the features that allow it to be combined with the traditional technology, can be achieved through the progressive implementation of the existing infrastructures with the new technology, becoming itself the supporting technology in the communications sector. In the meantime, the versatility of the instrument can immediately make it spendable, either by integrating the infrastructures with the need for new geographical areas to be covered with the present technology, with greater efficiency, safety and economy; both by replacing the existing BTS where economic reasons, such as those related to the deterioration of an apparatus that can be replaced or repaired, for example by replacing the physical circuit part present in the traditional BTS with the computer described, effectively transforming these BTS into DBTS; or even if strategic reasons, such as the security and impenetrability of a national infrastructure, require it.

This renewal can be carried out gradually and without compromising the functioning of the current data transmission protocols. In fact, thanks to the ability of the software present inside the 'VM' 112 virtual machine to create different configurations that simulate existing equipment, it is possible to commute the communications even with the structures that are based on the old protocols (IPX, UDP, TCP/IP), thus ensuring the perfect integration between the old infrastructures and the present TEP protocol.

At the same time, thanks to the radical reduction in size deriving from the dematerialization of the current BTS, the realization of new partially dematerialized BTS (DBTS) will progressively be implemented, which, thanks to the intrinsic characteristics of greater transportability and ease of installation due to the reduced dimensions, will be able to facilitate the spread, throughout the globe, of the TEP protocol even in areas of the planet currently not reachable by traditional wireless technology.

USE AND EXPLOITATION IN INDUSTRIAL AREA

The description provided in this document has the sole purpose of making the possible uses deriving from the exploitation of the TEP protocol comprehensible from a practical and conceptual point of view. It also appears evident to anyone in possession of ordinary skills in this specific area, to understand how the principles enunciated in the present invention can be concretized in numerous other forms and methods.

The TEP protocol has the objective of becoming the world's standard for communication protocols.

The numerous advantages deriving from its use, first of all the greater security of each transaction (communication), associated with the possibility of implementing this technology in a progressive manner and with minimal economic efforts, guaranteeing total compatibility with traditional protocols, make the implementation and exploitation of the TEP protocol not only advantageous but easily achievable.

The extreme flexibility of the TEP protocol also makes possible its temporary coexistence not only with the current protocols and with the existing network technology (GSM, 3G, 4G /LTE), but also with the future one, as possible implementations of the network standards, such as the 5G network and any subsequent developments.

In this sense, therefore, the TEP protocol has the necessary characteristics to be able to replace, in the short-medium term, the current protocols and, at the same time, effectively manage every future evolution of network technology.

Furthermore, being based on peer-to-peer technology, its use could be extended even beyond the traditional wireless communication systems managed by the single national providers. In fact, the contained cost necessary for its realization, the reduced size of the infrastructures necessary for its realization and the safety deriving from the use of the blockchain paradigm would allow to create secure communication networks for internal use for uses in strategic sectors such as, for example merely illustrative:

Military and Defense;
Diplomatic and consular circuits;
Aerospace;
Avionics;
Naval;
Major works;
Shipbuilding;
etc.

The invention claimed is:

1. A telecommunication apparatus, comprising:
   a calculator;
   a hypervisor physically installed in firmware of said calculator;

a copy of a distributed ledger; and an antenna, wherein the hypervisor is configured to launch a virtual machine executing a first application and a second application, and the distributed ledger contains a database of caller identifiers that transit through said telecommunication apparatus, each of the caller identifiers is recorded in the distributed ledger as a corresponding hash, and the first application executed by the virtual machine is configured to generate a data packet to be transmitted and is further configured to transmit the data packet as radiofrequency pulses emitted by the antenna; and the second application executed by the virtual machine is configured to select a hash recorded in the distributed ledger corresponding to a receiver of the data packet to be transmitted, and is further configured to provide said selected hash to the first application, and the first application is configured to insert said selected hash in the data packet to be transmitted.

2. The telecommunication apparatus according to claim 1, wherein the first application is configured to generate the data packet, and further comprising:

a cryptographic protection encapsulation capsule;

a descriptor encapsulation capsule; and a data encapsulation capsule containing data to be transmitted, wherein the descriptor encapsulation capsule encapsulates the data encapsulation capsule and the cryptographic protection encapsulation capsule encapsulates the descriptor encapsulation capsule.

3. The telecommunication apparatus according to claim 2, wherein the first application is further configured to encrypt the data packet to be transmitted according to a blockchain paradigm by using a public key of the receiver of the data packet.

4. The telecommunication apparatus according to claim 3, further comprising:

a third application, installed either in the firmware of said calculator, or executed by said virtual machine, the third application being configured to manage an encryption phase of the data packet according to a secure communication protocol, said protocol providing a further encryption capsule.

5. The telecommunication apparatus according to claim 1, wherein the second application is configured to generate and store in the distributed ledger a record of the data packet transmitted by the first application.

6. The telecommunication apparatus according to claim 1, wherein the first application is configured to implement a logic circuit to simulate existing equipment.

7. The telecommunication apparatus according to claim 6, wherein the first application is further configured to have the logic circuit to simulate an apparatus that operates as a node of a peer to peer network.

8. A mobile station comprising:

an EPROM storing a firmware comprising a physically installed hypervisor configured to launch a virtual machine which is configured to execute a first application and a second application, an antenna, and storing a distributed ledger which contains a database comprising caller identifiers that transit through said mobile station, wherein each one of the caller identifiers is recorded in the distributed ledger as a corresponding hash, wherein the first application executed by the virtual machine is configured to generate a data packet to be transmitted and transmit the data packet as radiofrequency pulses emitted by the antenna; the second application executed by the virtual machine is configured to select a hash recorded in the distributed ledger corresponding to a receiver of the data packet to be transmitted, and is further configured to provide said selected hash to the first application, and the first application is configured to insert said selected hash in the data packet to be transmitted.

9. The mobile station according to claim 8, further comprising:

a memory card configured to store a computer software product that when executed by the hypervisor instantiates said virtual machine.

10. The mobile station according to claim 8, wherein the first application is configured to generate the data packet comprising:

a cryptographic protection encapsulation capsule;

a descriptor encapsulation capsule; and a data encapsulation capsule containing data to be transmitted, wherein the descriptor encapsulation capsule encapsulates the data encapsulation capsule and the cryptographic protection encapsulation capsule encapsulates the descriptor encapsulation capsule.

11. The mobile station according to claim 10, wherein the first application is further configured to encrypt the data packet to be transmitted according to a blockchain paradigm by using a public key of the receiver of the data packet.

12. The mobile station according to claim 10, further comprising:

a third application, installed either in the firmware stored in the EPROM, or executed by the virtual machine, the third application being configured to manage an encryption phase of the data packet according to a secure communication protocol, said protocol providing a further encryption capsule.

13. The mobile station according to claim 8, wherein the second application is further configured to generate and store a record of the data packet transmitted in the distributed ledger.

14. The mobile station according to 8, wherein the first application is configured to implement a logic circuit which is configured to simulate existing equipment.

15. The mobile station according to 14, wherein the first application is further configured to have the logic circuit to simulate an apparatus that operate as a node of a peer to peer network.

16. A method for data exchange among nodes of a telecommunication network, comprising:

computing a plurality of hashes by means of an encryption technique, each hash identifying a corresponding node of the telecommunication network;

establishing a distributed ledger which is distributed among all the nodes of the network, the distributed ledger memorizing said plurality of hashes, a copy of said distributed ledger being stored by each node of the telecommunication network, and for each data packet to be transmitted:

selecting, by a hypervisor physically installed in firmware of a calculator, a hash corresponding to an address of the destination node of the data packet, wherein the hash is selected among the plurality of the hashes memorized by the distributed ledger;

associating, by the hypervisor, the data packet to the selected has; and transmitting the data packet to a receiver via a radiofrequency transmission.

17. The method according to claim 16, further comprising:

associating the data packet to a further hash corresponding to an address of the sender node of the data packet.

18. The method according to claim 16, wherein associating the data packet to the hash corresponding to the address of the receiver of the data packet further comprises:
   encapsulating the data packet with an encapsulation capsule comprising a header including said hash.

19. The method according to claim 16, further comprising:
   generating a data hash comprising information regarding the data packet;
   recording said data hash in the distributed ledger as a transaction data in a data block of the distributed ledger.

\* \* \* \* \*